Nov. 18, 1924.
F. W. HOLDERLE ET AL
1,516,190
BEVERAGE DISPENSING DEVICE
Filed Aug. 15, 1921  2 Sheets-Sheet 2
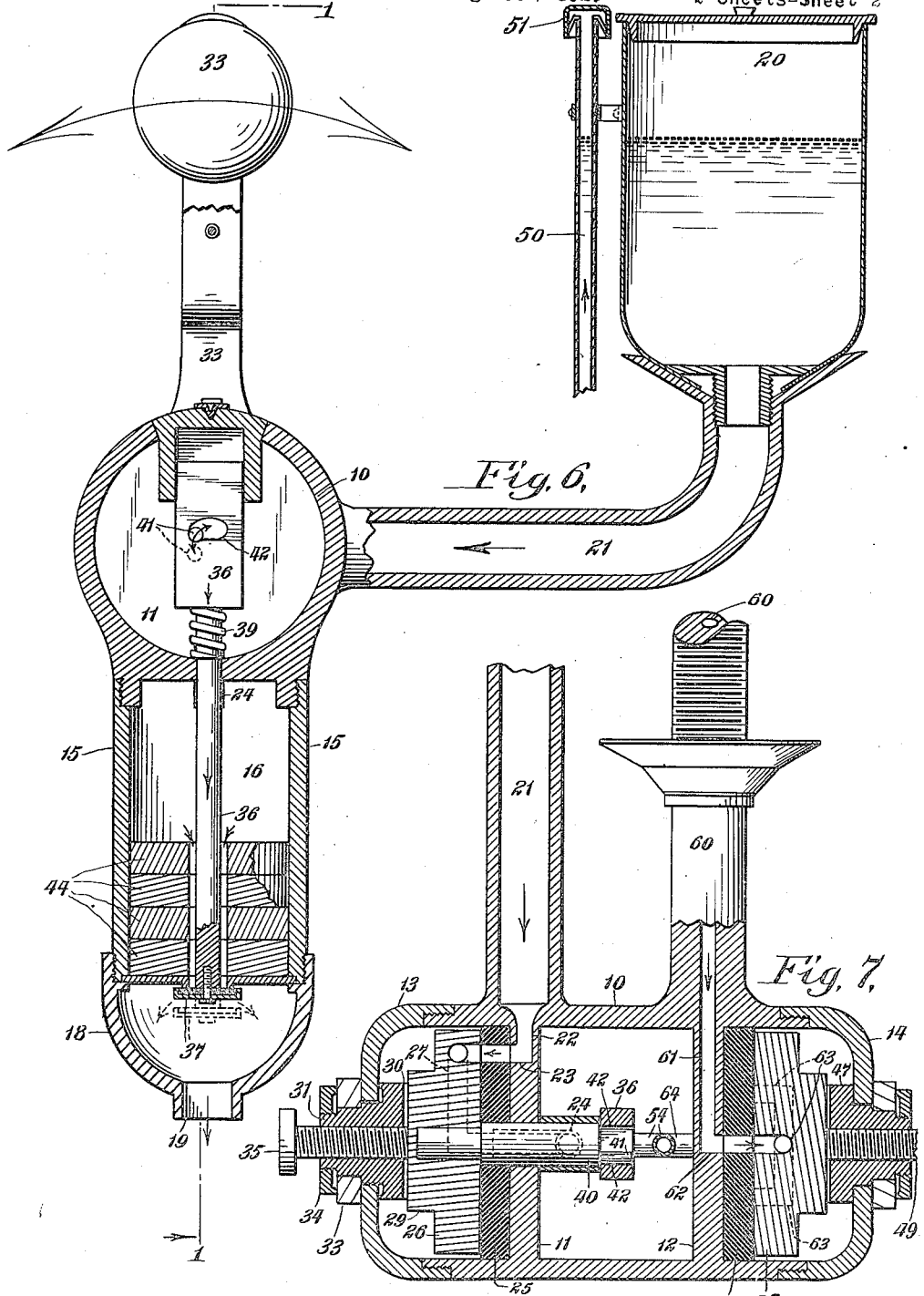
Frederick W. Holderle
Carl L. Holderle Inventors
by Geyer & Popp Attorneys, Patented Nov. 18, 1924.                                              1,516,190

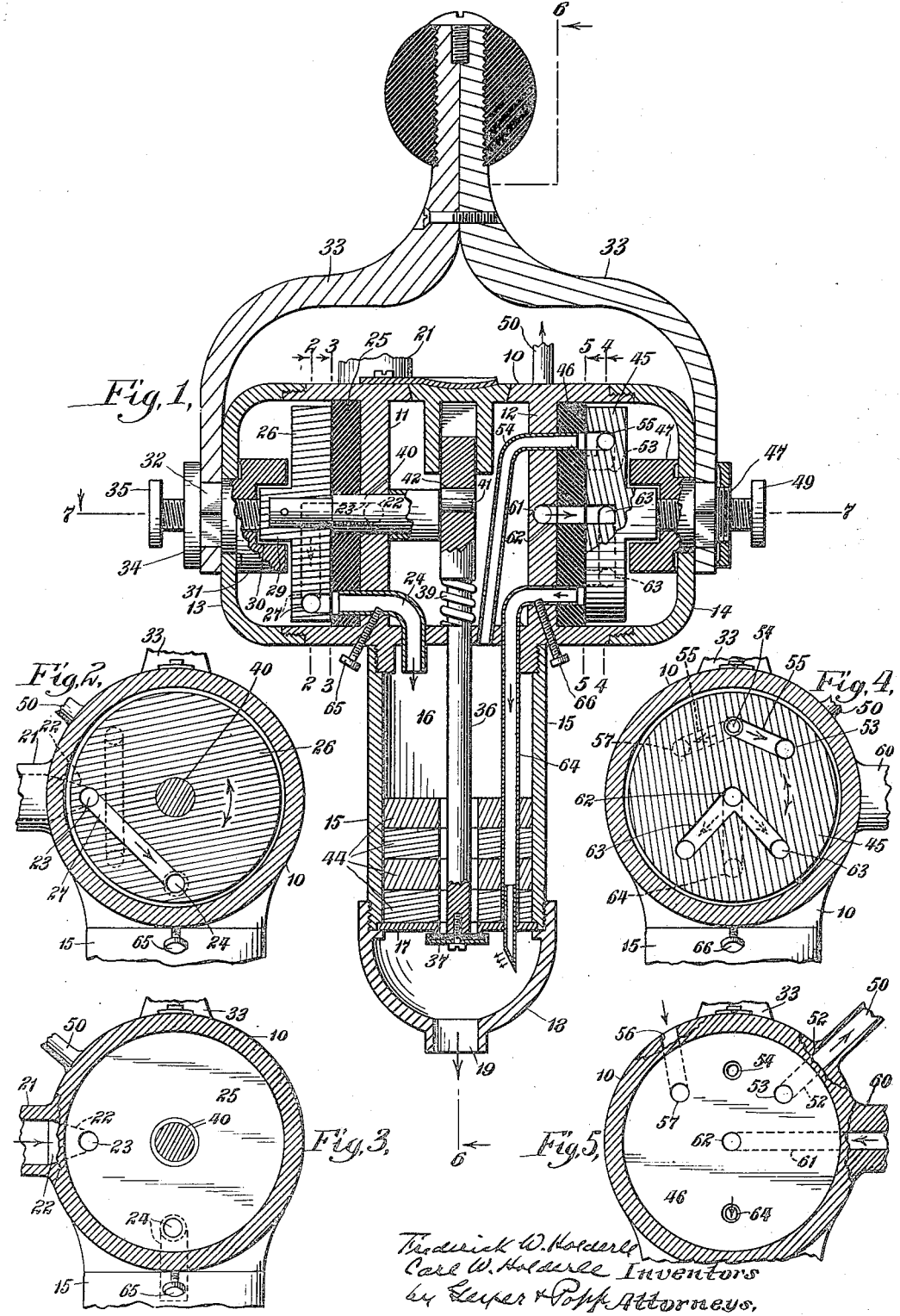

UNITED STATES PATENT OFFICE.

FREDERICK W. HOLDERLE AND CARL L. HOLDERLE, OF ROCHESTER, NEW YORK.

BEVERAGE-DISPENSING DEVICE.

Application filed August 15, 1921. Serial No. 492,240.

*To all whom it may concern:*

Be it known that we, FREDERICK W. HOLDERLE and CARL L. HOLDERLE, citizens of the United States, residing at Rochester, in the county of Monroe and State of New York, have invented new and useful Improvements in Beverage-Dispensing Devices, of which the following is a specification.

This invention relates to a combined valve and measuring chamber for dispensing, (when its handle is operated) a definite amount of syrup together with a quantity of water, and relates to a device for producing a given quantity or charge of either a "still" drink such as root-beer, limeade, orangeade, or carbonated drink such as soda water.

One of the objects of the invention is to provide a device which will unfailingly charge each customer's glass with exactly the same amount of syrup. A further object of the invention is to provide a means of first partially filling the customer's glass with water together with a definite amount of syrup, and thereafter allowing the glass to be filled up the rest of the way with water only, so as to sanitarily wash all of the syrup out of the mixing bowl of the dispensing device.

In the accompanying drawings:

Figure 1 is a fragmentary vertical, longitudinal section through the dispensing device taken on line 1—1 Fig. 6. Figures 2, 3, 4 and 5 are fragmentary, vertical, transverse sections through the valve casing and taken on correspondingly numbered lines of Fig. 1. Figure 6 is a fragmentary, vertical, transverse section through the dispensing device taken on line 6—6 Fig. 1. Figure 7 is a fragmentary, horizontal, longitudinal section through the valve casing taken on line 7—7 Fig. 1.

Similar characters of reference indicate corresponding parts in the several views.

Inasmuch as the nomenclature in this particular art is quite generally filled with trade names but rather scantily supplied with general descriptive terms, it is to be understood that the term "water" hereinafter to be used in this specification refers to either soda water, plain drinking water, or distilled water, and that the term "syrup" refers to any flavoring, coloring or sweetening liquid or extract which is to be mixed with the water so as to produce a salable beverage.

10 represents a main stationary casing whose upper portion is substantially of cylindrical shape and is provided with a pair of preferably integral, vertical, transverse partitions 11 and 12 and a pair of cup-shaped caps or heads 13 and 14 which latter screw onto the opposite longitudinal ends of said casing 10. Screwed onto the central lower face of the main portion of the casing is a measuring cylinder 15 whose bore or interior forms a measuring chamber 16. The lower end of said measuring chamber is sealed off by a bottom disk 17, which disk makes a liquid tight joint with said measuring cylinder 15 and is suitably compressed upwardly thereagainst by a cup-shaped mixing bowl 18 whose lower part is provided with a discharge vent 19. The general operation of the invention is to first fill the measuring chamber 16 with syrup, and then to discharge the same into the mixing bowl 18 together with some water, (which mixture is discharged through the vent 19 into the customer's glass) and finally, to wash out the mixing bowl 18 with water only, until the customer's glass is properly filled up.

20 is the usual syrup container or reservoir adapted to be periodically replenished with additional syrup, which passes from said reservoir downwardly through a comparatively large syrup pipe 21, and then through a comparatively small channel 22 which is formed transversely in the rear part of the casing partition 11. The syrup then passes through a short channel 23, which is formed longitudinally at the rear part of the said partition 11 and extends from the aforesaid channel 22 to the outer face of said partition. Arranged with a fluid tight joint in the lower part of said partition, is an L shaped syrup tube 24 whose outer end preferably extends longitudinally a short distance outwardly of the outer face of said partition 11, and whose lower end is bent downwardly and vents into the upper part of the aforementioned measuring chamber 16. Preferably arranged in a manner common to the art, against the outer face of the said partition 11 is a syrup valve seat 25 of disk shape and composed of leather, rubber or other like yielding material and the same is, of course, provided with a pair of holes which register respectively with the horizontal arm of the syrup tube 24 and with the aforesaid longitudinal channel 23 (see Figure 3). Disposed against the outer face of said syrup valve seat 25 is a syrup valve 26, which is provided with a long transverse channel 27. The latter is formed in the main body of said syrup valve 26 and opens at its opposite ends into a pair of short transverse holes which extend from said opposite ends of said channel 27 longitudinally inwardly to the inner vertical face of said valve. In the normal position of the beverage dispensing device, the ends of this transverse channel 27 register respectively with the longitudinal channel 23 and with the horizontal or outer end of the syrup tube 24. In this position, the syrup is free to pass from the syrup reservoir 20 through the pipe 21, transverse channels 22 and 23, through the transverse channel 27 of the syrup valve and thence through the pipe 24 into the measuring chamber.

This flow of syrup from the reservoir 20 to the measuring chamber 16 occurs only, however, when the valve 26 is in its normal position, shown by full lines in the drawings. The flow may be cut off by a rotation of the syrup valve 26 which is accomplished as follows: Formed on the outer central vertical face of the syrup valve 26 is a squared head or ridge 29 which is somewhat loosely but non-rotatably receivable within a squared, transverse slot or groove 30 formed in the inner vertical face of a rotatable head 31. The longitudinally central portion of the periphery of said head is of cylindrical shape forming a cylindrical or annular bearing which is journaled coaxially in the end cap 13 of the main casing. Formed on said head 31 outwardly of the said annular bearing is a squared portion 32 which is received within a square hole formed in the lower end of the usual operating handle 33, the latter being firmly clamped to the head 31 by a suitable lock nut 34 whose internal threads engage with suitable male threads formed on the outer longitudinal periphery of said head (see Figure 7), the inner face of said nut 34 bearing firmly against the outer vertical face of the operating handle 33. By this construction, the said handle is pivotally mounted on the main casing 10 and when manually moved by the operator, effects a rotary movement of the valve 26 and operates to cut off the flow of syrup into the measuring chamber 16. To take up the wear of the rotary valve 26 upon its seat 25, an adjusting screw 35 is provided which passes longitudinally and coaxially through the head 31 and adjustably bears with its inner end against the central outer face of the ridge 29 of said syrup valve 26.

Slidably arranged in the main casing 10 and extending vertically and coaxially through the measuring chamber 16, is a discharge valve rod 36 provided with a discharge valve 37 at its lower end. Said valve is yieldably held upwardly against its annular seat on the bottom disk 17 by means of a compression spring 39 whose lower end bears against the casing 10 and whose upper end bears against a suitable shoulder on the discharge valve rod 36. The said discharge valve 37 controls the flow of syrup from the measuring chamber 16 down into the mixing bowl 18 and is actuated as follows:—Arranged horizontally and coaxially in the upper part of the main casing 10 is a longitudinal crank shaft 40 whose outer end is suitably received within and is secured to the syrup valve 26 so as to rotate synchronously therewith. The inner end of said crank shaft 40 is provided with a crank arm 41 which is of course eccentric with respect to the axis of rotation of the valve 26 (see Figure 6) and is received within an arcuate hole 42 formed horizontally and transversely in the upper squared part of the discharge valve rod 36. When the handle 33 is moved forwardly from its normal position, the crank arm 41 shifts to the dotted line position shown in Fig. 6, and operates to depress the said rod 36 and thus open the discharge valve 37. When, however, the operating handle 33 is moved rearwardly from the normal position which is shown in the drawings, the said crank arm 41 merely traverses the arcuate hole 42 and does not actuate the discharge valve 37. It should be noted that, in the normal position of said operating handle 33, the syrup is allowed to flow from the reservoir 20 through the syrup valve 26 and into the measuring chamber 16, the discharge valve 37, however, being at this time closed. If thereafter the handle 33 be moved forwardly, the flow of syrup into the measuring chamber 16 is cut off and at the same time, the flow therefrom is opened by the opening of the discharge valve 37. When, on the other hand, the handle 33 is moved rearwardly, both the flow of syrup into and also out of said measuring chamber is cut off for reasons to be subsequently explained. The capacity of the measuring chamber 16 may be altered by increasing or decreasing the number of volume-adjusting plates 44 of disk form which plates are adapted to rest in the lower bore of the measuring cylinder 15 and may be removed therefrom by unscrewing the mixing bowl 18, valve 37 and bottom disk 17, each of said plates having an opening in line with the outlet of the measuring chamber.

The right hand end of the upper portion of the main casing is provided with a combined valve 45 whose general construction is analogous to that of the syrup valve 26 before described, i. e., its inner vertical flat face bears against the outer, vertical flat face of a leather disk seat 46; it is actuated by a head 47 whose longitudinally central portion is journaled in the main casing 10 and whose outer end is squared and thereby rendered capable of being rotated by the operating handle 33; and it is adjustably pressed inwardly against its seat 46, so as to permit of compensating for wear by means of an adjustment screw 49. This combined valve 45 controls the flow of air into and from the measuring chamber, and also controls the flow of water into the mixing bowl 18.

Preferably arranged adjacent to the syrup reservoir 20 is a stand pipe 50, whose upper end is covered with a dust cap 51 which prevents dirt, flies, etc., from entering the pipe but permits the passage of air therefrom. This stand pipe 50 leads down to the rear upper part of the casing 10 adjacent to the partition 12 thereof and communicates with a lateral obliquely-sloping air channel 52 which is formed in the body of said partition 12 and which communicates at its inner end, with an air channel 53 likewise formed in the body of said partition and extending longitudinally outwardly to the inner vertical face of said combined valve 45, the valve seat 46 being of course, provided with a hole, which registers with said channel 53 (see Fig. 5), in fact, all openings formed in the outer faces of the partitions 11 and 12 are duplicated, in the stationary, soft valve seats 25 and 46 which latter rest stationarily against the outer vertical face of the same. Extending longitudinally through the upper part of said partition 12 is a vent tube 54 whose inner end bends abruptly downwardly and is hermetically secured, at its lower end, to the main casing 10 and opens into the upper part of the measuring chamber 16. In the normal position of the operating handle 33, this vent tube 54 is tubularly connected with the aforesaid air vent pipe 50, by a short air channel 55 which is formed laterally in the upper part of the body of the combined valve 45 and opens, at its opposite ends, longitudinally inwardly into the inner vertical face of said combined valve. Also formed in the upper part of the main body of the partition 12 is an air-suction channel or pipe 56 which is open to the atmosphere at its outer end and at its inner end bends sharply, longitudinally to form an air channel 57 opening longitudinally outwardly against the inner vertical face of the valve 45. The purpose of this construction is to only vent the measuring chamber 16 through the stand pipe 50 when the said chamber is filling with syrup and to only vent the said chamber through the air-suction pipe 56, when the said chamber is discharging syrup. In this way, the variable quantity of syrup which rises in said stand pipe 50, is cut off during the discharge and therefore cannot affect the measured quantity of syrup discharged from said measuring chamber 16. This changing of the air vent is accomplished, synchronously with the movement of the handle 33, by reason of the fact that the opposite ends of the air channel 55 of the valve 45, first register with the air tube 54 and air channel 53 and thereafter register with the said air tube 54 and air channel 57. In the first named position, (shown by full lines in Figs. 1 and 4), the syrup is flowing into the measuring chamber 16 and the syrup discharge valve 37 is closed. In the last named position, (indicated by dotted lines Fig. 4) the syrup is flowing out from said measuring chamber, the syrup valve 26 is closed, and the syrup discharge valve 37 is open, allowing the precise quantity of syrup, which previously had filled the measuring chamber 16, to flow into the mixing bowl 18. In the meantime, the syrup in the stand pipe 50 is trapped and is not only prevented from affecting the quantity of syrup delivered but helps to quickly fill up the measuring chamber 16 when the handle 33 is again moved to its normal position.

Formed preferably on the rear face of the main casing 10 is a water pipe 60 (see Fig. 7) which communicates with a lateral, horizontal water channel 61 formed in the rear part of the main body of the partition 12. The inner end of said water channel 61 is disposed coaxially with respect to the axis of the combined valve 45 and bends abruptly longitudinally outwardly to form a water channel 62 which opens outwardly against the inner vertical face of said combined valve 45. Registering with said channel 62 at all times is an L shaped water channel 63 which as shown in Figure 4 is "blind" in its normal position, i. e., no water flows therethrough. The outer or lower ends of said L shaped channel bend abruptly longitudinally inwardly and open into the vertical inner face of the valve. Thus, if the operating handle 33 be moved either forwardly or rearwardly, water will flow from the water pipe 60 through the said channel 63 of said combined valve 45 and down through a water tube 64 whose upper end is bent sharply longitudinally outwardly and opens against the vertical inner face of said combined valve 45.

The operation of the improved beverage dispensing device is as follows: When the operating handle 33 is in its normal position, syrup flows from the reservoir 20 through the syrup valve 26 and into the measuring chamber 16, the speed of flow being suitably controlled by a syrup regulating screw 65. At this same time, the said measuring chamber 16, is being vented through the vent tube 54, and through the combined valve 45 and stand pipe 50, the syrup in said stand pipe rising, of course, to whatever may happen to be the syrup level in the reservoir 20. The attendant or operator now grasps the handle 33 and moves the same forwardly, thereby cutting off all communication between the reservoir 20 and the measuring chamber 16, and opening the syrup discharge valve 37, allowing the accurately measured quantity of syrup to flow into the mixing bowl 18. At this same time, the syrup in stand pipe 50 is trapped and the measuring chamber 16 vented through air suction pipe 56 instead of the stand pipe 50 as heretofore. Inasmuch as the amount of syrup in stand pipe 50 is variable, because of variable levels in reservoir 20, by this means of trapping the syrup in stand pipe 50, the quantity of syrup actually dispensed from measuring chamber 16 is absolutely uniform. While the syrup is flowing into the mixing bowl 18, water is also flowing therein from the water pipe 60, through the combined valve 45 and through water tube 64, mixing thoroughly with the syrup because of the spraying and swirling action in the mixing bowl which is very desirable. The speed of flow of this water is controlled by a suitable water regulating screw 66. The operator may move the handle 33 rearwardly. In this position only water is permitted to flow. This permits the attendant to fill up a customer's glass with water only, when said customer desires the same. This improved dispensing device measures an absolutely accurate charge of syrup unaffected by the level of the surface of the syrup in reservoir 20. If it is desired to alter the quantity of the charge, merely the number of volume regulating plates 44 is altered.

It should be understood that the feeding of plain water only into a customer's glass is a feature of this invention which is practically divorced from the syrup portion of the device. That is, the only time the attendant moves the operating handle 33 rearwardly is when the customer wants a pure water or plain soda water "chaser." Otherwise the attendant only moves the said operating handle 33 forwardly. In this forward position of the said operating handle 33, the syrup charge is first caused to be forced into the customer's glass together with a quantity of water, and then after the syrup flow from the measuring chamber 16 has ceased, the water continues to flow and the attendant continues to hold the handle 33 in its forward position, until the customer's glass has been filled to the proper level. In this manner each customer is given exactly the same charge of syrup and the glass is filled up to the proper level, irrespective of the size of the glass and irrespective of the height of the syrup level in reservoir 20.

We claim as our invention:

1. A beverage dispensing device comprising a casing having a measuring chamber; a syrup pipe, a stand pipe, an air suction pipe and a discharge valve communicating with said chamber; a water pipe; a mixing bowl communicating with said water pipe and the aforesaid discharge valve; and means for first opening said syrup pipe and said stand pipe and thereafter opening said air suction pipe and said water pipe and said discharge valve.

2. A beverage dispensing device comprising a casing having a measuring chamber; a syrup pipe, a stand pipe, an air suction pipe and a discharge valve communicating with said chamber; a water pipe; a mixing bowl communicating with said water pipe and the aforesaid discharge valve; and means for first opening said syrup pipe and said stand pipe, and thereafter opening said air suction pipe and said water pipe and said discharge valve, and finally opening up the water pipe only.

FREDERICK W. HOLDERLE.
CARL L. HOLDERLE.